(12) United States Patent
Maruyama et al.

(10) Patent No.: US 6,624,942 B2
(45) Date of Patent: Sep. 23, 2003

(54) OBJECTIVE LENS FOR OPTICAL PICK-UP

(75) Inventors: Koichi Maruyama, Tokyo (JP); Shuichi Takeuchi, Saitama-ken (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 10/166,680

(22) Filed: Jun. 12, 2002

(65) Prior Publication Data
US 2003/0048535 A1 Mar. 13, 2003

(30) Foreign Application Priority Data
Jun. 13, 2001 (JP) .......................................... 2001-179127

(51) Int. Cl.⁷ .............................. G02B 27/44; G02B 5/18
(52) U.S. Cl. ........................ 359/566; 359/569; 359/570; 359/571; 359/574; 359/575; 369/112.03; 369/112.07
(58) Field of Search ................................ 359/566, 569, 359/570, 571, 573, 574, 575; 369/112.03, 112.07, 112.08, 112.12, 112.13, 112.25

(56) References Cited

U.S. PATENT DOCUMENTS

| | | | | |
|---|---|---|---|---|
| 5,526,338 A | * | 6/1996 | Hasman | 369/94 |
| 5,838,496 A | * | 11/1998 | Maruyama | 359/565 |
| 5,986,779 A | * | 11/1999 | Tanaka | 359/19 |
| 6,088,322 A | * | 7/2000 | Broome | 369/112.26 |
| 6,118,594 A | | 9/2000 | Maruyama | |
| 6,166,854 A | * | 12/2000 | Katsuma | 359/569 |
| 6,191,889 B1 | | 2/2001 | Maruyama | |
| 6,342,976 B1 | * | 1/2002 | Nomura | 359/722 |
| 6,344,935 B1 | | 2/2002 | Maruyama | |

FOREIGN PATENT DOCUMENTS

EP 1102251 5/2001

* cited by examiner

*Primary Examiner*—John Juba
*Assistant Examiner*—Leo Boutsikaris
(74) *Attorney, Agent, or Firm*—Greenblum & Bernstein, P.L.C.

(57) ABSTRACT

An objective lens for an optical pick-up has a refractive lens element provided with a diffraction lens structure on at least one surface thereof. The diffraction lens structure has a plurality of annular zones. The objective lens is capable of converging at least two beams having different wavelengths on at least two types of optical discs having different data recording densities, respectively. The objective lens is partitioned into a common area through which a beam with a low NA passes, and an exclusive high NA area which is designed to converge a beam with a high NA. The boundaries of the annular zones formed on the exclusive high NA area are designed independently from boundaries obtained from an optical path difference function so that the beam with the high NA is converged substantially on a certain point and the beam with the low NA is diffused.

10 Claims, 5 Drawing Sheets

OBJECTIVE LENS FOR OPTICAL PICK-UP

BACKGROUND OF THE INVENTION

The present invention relates to an objective lens for an optical pick-up employed in an optical disc drive using at least two kinds of optical discs having different data densities. Conventionally, optical discs having different data recording densities have been known. For example, a DVD (digital versatile disc) has a greater data density than a CD (compact disc).

It is generally known that the data density of an optical disc and a beam spot formed on the optical disc are closely related. The beam spot is required to have a predetermined size in relation to a width of a track on the data recording surface of the optical disc. The track width is smaller for the high data density optical disc, while it is greater for the less data density optical disc. If the spot size is too large with respect to the track width, information recorded on adjoining track(s) may be read out as a noise. In a disc system which utilizes diffraction of light for reproducing data signals as in the CD system, if the spot size is too small, a sufficient diffraction effect may not be obtained, and the recoded data may not be read out correctly.

The size of the beam spot is smaller if the wavelength is shorter and an NA (numerical aperture) of an optical system is greater. Therefore, for the DVD system, an optical system is required to have a large NA and to use a light beam having a relatively short wavelength. For the CD system, an optical system is required to have a relatively small NA and to use a light beam having a relatively long wavelength. In particular, if a CD-R (CD recordable) is to be used, the wavelength of the light beam should be approximately 780 nm or longer in view of a reflection characteristic of the CD-R.

Therefore, in order to satisfy the requirement regarding the wavelength, an optical disc drive capable of using the DVD and CD-R is required to use two light sources capable of emitting a shorter wavelength beam (e.g., approximately 650 nm) for the DVD, and a longer wavelength beam (e.g., approximately 780 nm) for the CD (or CD-R).

In order to deal with the requirement of the NA, in a conventional optical system for a CD-DVD compatible optical pick-up, an aperture control mechanism is employed to achieve the required NA. For controlling the NA, a variable aperture or wavelength selective filter may be employed so that the beam size is changed depending on whether the CD is used or the DVD is used. However, in such a structure, i.e., the aperture mechanism or the filter is employed, due to increase of the number of parts, the weight and size of the optical system increases.

There has been conventionally suggested an objective lens provided with a diffraction lens structure for the optical pick-up applicable to the DVD-CD compatible optical disc drive. In such an objective lens, the wavefront of the light beam passed through the diffraction lens structure has a wavelength dependency such that appropriate wavefront is formed according to the two types of optical discs since the wavelengths of beams for the optical discs are different. In this conventional art, the diffraction lens structure generally has a plurality of annular zones, the boundaries of which are obtained based on an OPD function such that, at the boundaries, the amount of the optical path length added by the diffraction lens structure equals to an integer multiple m of the blaze wavelength. Such an objective lens, of which the boundaries of the annular zones are determined as described above, uses an m-th order diffraction light.

In the conventional objective lens formed with the diffraction lens structure, if the boundaries of the annular zones are designed as described above, the diffraction lens structure formed in the exclusive high NA area may not diffuse the beam incident thereon sufficiently when a beam for the low data density disc is used. Therefore, in some cases, when the low data density disc is used, noises may be generated.

SUMMARY OF THE INVENTION

The present invention is advantageous in that it provides an objective lens for an optical pick-up which does not require the aperture mechanism or the filter which has been employed in the conventional optical system.

In order to provide the above advantages, according to an aspect of the invention, there is provided an objective lens for an optical pick-up, which consists of a refractive lens element provided with a diffraction lens structure on at least one surface of the refractive lens element. The diffraction lens structure has a plurality of annular zones having steps therebetween. The objective lens is capable of converging at least two beams having different wavelengths on at least two types of optical discs (e.g., DVD and CD) having different data recording densities, respectively. The objective lens is partitioned into a common area through which a beam with a low NA corresponding to a low data density optical disc passes, and an exclusive high NA area which is designed to converge a beam with a high NA corresponding to a high data density optical disc. A base curve and an optical path difference function for the exclusive high NA area are determined so that a beam having a wavelength required to the high data density optical disc is sufficiently converged on the high data density optical disc. The boundaries of at least a part of the annular zones formed on the exclusive high NA area are designed independently from boundaries obtained from the optical path difference function while substantially keeping the base curve so that the beam with the high NA is converged substantially on a certain point and the beam with the low NA is diffused.

With the above configuration, the exclusive high NA area substantially functions to restrict the diameter size of the beam for the disc having the low data recording density.

In order to achieve the function to restrict the diameter size of the beam, the diffraction order the exclusive high NA area utilizes should not be determined to be a fixed order, such as second or third. Rather, the balance of light passing through the entire exclusive high NA area. It should be noted that a light source for an optical disc drive can be considered to emit a monochromatic beam. Therefore, the exclusive high NA area may utilize components of a plurality of diffraction orders.

For the beam corresponding to the high data density optical disc, the annular zones formed within the exclusive high NA area should be configured such that light passed through the exclusive high NA area is converged substantially at one point. It should be noted that designing such a configuration has certain degree of freedom. Accordingly, with maintaining the above condition, the width of each annular zone may be determined individually, a configuration which sufficiently diffuse the beam corresponding to the low data density optical disc can be obtained. Generally, the deviation of the wavelength of a laser beam ranges approximately 3% with respect to the design wavelength. Therefore, even though the locations of the steps obtained from the OPD function are shifted, if the change is within several times the wavelength with respect to the base curve, a desired wavelength characteristics can be achieved.

Generally, the beam with the low NA has a first wavelength, and the beam with the high NA has a second wavelength, the first wavelength being larger than the second wavelength. Typically, the two types of the optical discs are CD (or CD-R) and DVD. The beam for the CD has a wavelength of approximately 780 nm, while the beam for the DVD has a wavelength of approximately 650 nm. That is, the first wavelength (i.e., 650 nm) is less than 90% of the second wavelength (i.e., 780 nm).

According to another aspect of the invention, there is provided an objective lens for an optical pick-up, the objective lens converging at least two beams having different wavelengths to form beam spots having different sizes on optical discs having different data recording densities, respectively. Such an objective lens has a refraction lens having a positive power, and a diffraction lens structure having a plurality of annular zones formed on at least one surface of the refraction lens. The objective lens is partitioned into a common area through which a beam with a low NA corresponding to a low data density optical disc passes and an exclusive high NA area through which only a beam with a high NA corresponding to a high data density optical disc passes.

The diffraction lens structure formed in the common area exhibits spherical aberration which has a wavelength dependency such that variation of aberration due to difference of cover layers of the two types of optical discs is canceled by difference of wavelengths of the beams.

The diffraction lens structure formed in the exclusive high NA area has a plurality of annular zones, and exhibits no aberrations with respect to a beam converging point for the optical disc having the high data recording density for the beam used for the optical disc having the high data recording density.

The plurality of annular zones includes at least one wide-width zone which is configured such that, with respect to a beam converging point for the disc having the low recording density, a difference of optical path lengths at inner side end and outer side end of the at least one wide-width zone is equal to or more than 0.6 times the wavelength of the beam used for the optical disc having the low data recording density.

With this configuration, since the diffraction lens structure formed in the exclusive high NA area provides no aberration for the disc having the higher data recording density, it provides wavefront aberration for the disc having the lower data recording density. Thus, the exclusive high NA area of the objective lens diffuses the light passed therethrough when the disc having the lower data recording density is used. Preferably, in this case, the phase of the light having the longer wavelength and passed through the exclusive high NA area is not concentrated in a certain direction but evenly distributed (i.e., 360°). If the phase is evenly distributed, the light passed through the exclusive high NA area can be well diffused, and the diameter of the beam can be restricted substantially.

Optionally, the diffraction lens structure formed in the exclusive high NA area may be configured such that a step is formed at each boundary of the at least one of the wide-width zones and an other portion, the step providing an optical difference of m times the wavelength of the beam for the disc having the high data recording density, m being an integer not less than two.

Further optionally, at least one wide-width zone may consist of m of the plurality of wide-width annular zones. The m of the plurality of wide-width annular zones being arranged stepwise such that each of the m of the plurality of wide-width annular zones provides an optical path length difference of one wavelength of the beam for the disc having the high data recording density.

In this case, at least one narrow-width annular zone which may provide an optical path difference of less than 0.6 times the wavelength of the beam for the disc having the high data recording density is arranged between the m of the plurality of wide-width annular zones.

The objective lens may be configured to satisfy the conditions:

$10\lambda_h/(n0-n1) < Ww$; and $\lambda_h/(n0-n1) < Wn < 10\lambda_h/(n0-n1)$, wherein $\lambda_h$ represents a wavelength of the beam for the disc having the low data recording density, n0 represents a refractive index of the air, n1 represents a refractive index of the refraction lens element, Ww represents a width of each of the m of the plurality of wide-width annular zones, and Wn represents a width of each of the at least one narrow-width annular zone providing an optical path difference of less than 0.6 times the wavelength of the beam for the disc having the high data recording density.

Still optionally, at least one of the plurality of annular zones may include a plurality of wide-width annular zones, each of which is configured such that, with respect to a beam converging point for the disc having the low recording density, a difference of optical path lengths at inner side end and outer side end of the at least one of the plurality of wide-width annular zones being equal to or more than 0.75 times the wavelength of the beam used for the optical disc having the low data recording density.

Further optionally, a difference of optical path difference $\Delta OPD$ at inner side end and outer side end of each of the at least one of the plurality of wide-width annular zones may satisfy a condition:

$0.75\lambda < \Delta OPD < 1.25\lambda$, wherein, $\lambda$ represents a wavelength of the beam for the disc having the low data recording density.

DETAILED DESCRIPTION OF THE EMBODIMENTS

Hereinafter, embodiments according to the present invention will be described with reference to the accompanying drawings.

Figure 1A:
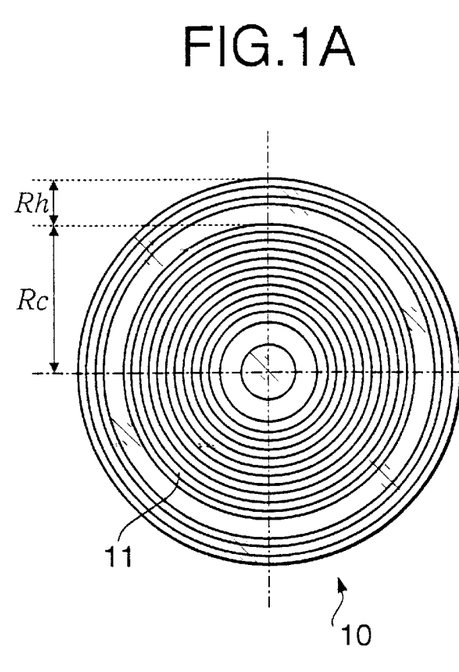
FIG. 1A shows a front view.
Figure 1B:
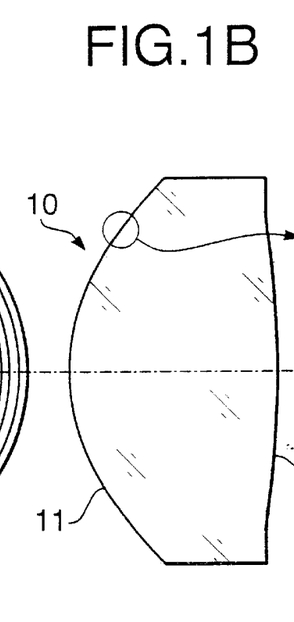
FIG. 1B is a cross-sectional side view.
Figure 1C:
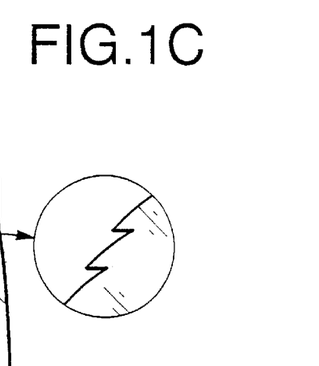
FIG. 1C is a partially enlarged side view of an objective lens according to the invention.

FIGS. 1A–1C show a structure of an objective lens 10 for an optical pick-up to which the invention is applicable. FIG. 1A is a front view, FIG. 1B is a cross-sectional side view, and FIG. 1C is a partially enlarged cross-sectional side view of the objective lens 10.

The objective lens 10 is for use in an optical pick-up of a DVD-CD (and CD-R) compatible optical data recording/readout device. In the optical pick-up, the objective lens 10 converges laser beams having different wavelengths, which are emitted by laser diodes. Each laser beam converged by the objective lens 10 forms a beam spot on a data recording surface of an optical disc (i.e., DVD, CD or CD-R).

The objective lens 10 is a single-element biconvex lens made of resin. On one surface 11, a diffraction lens structure composed of a plurality of annular zones concentrically arranged about the optical axis are formed. The annular zones have steps at boundaries therebetween. The steps have circumferential walls, generatrices of which extend along the optical axis thereof.

A surface of the objective lens 10 is divided into two portions: a central portion (which will be referred to as a common area) Rc; and the remaining peripheral portion (i.e., outside the common area Rc) will be referred to as an exclusive high NA area Rh.

A light beam for recording/reading out data on the CD or CD-R which has a relatively low recording density, passes through the common area Rc, and is converged on the CD or CD-R. A light beam for recording/readout of data on the DVD which has a relatively high recording density, passes through the common area Rc and the exclusive high NA area Rh, and is converged on the DVD. The diffraction lens structure is formed over both the common area Rc and the exclusive high NA area Rh. The common area Rc is designed as an area within a boundary which corresponds to NA whose value is within a range of 0.45 through 0.50.

Figure 2:
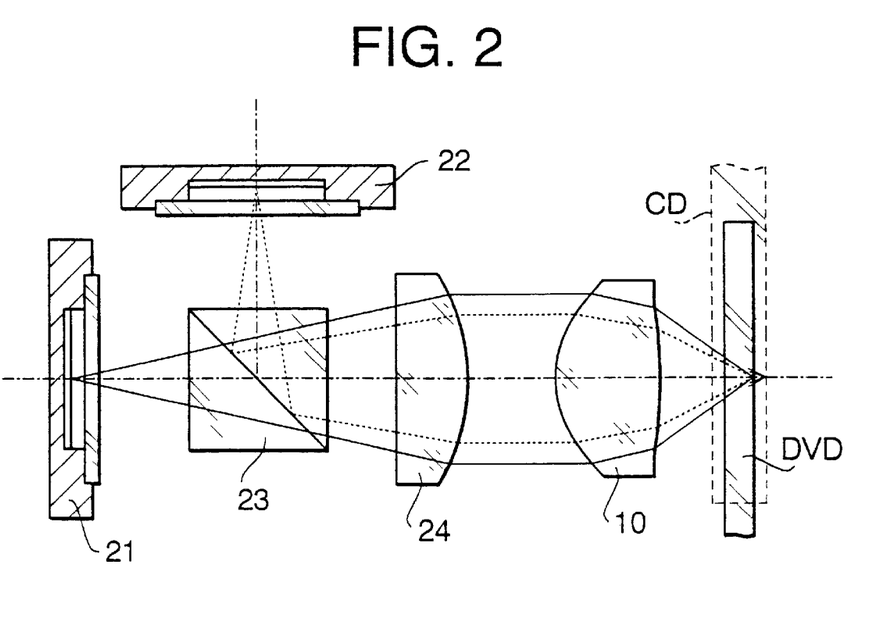
FIG. 2 schematically illustrates a configuration of an optical system of an optical head to which an objective lens according to the invention is applied.

FIG. 2 schematically shows a configuration of an optical pick-up employing the objective lens 10 shown in FIGS. 1A–1C.

The optical pick-up shown in FIG. 2 includes a DVD light source module 21, a CD light source module 22, a beam combiner 23, a collimating lens 24 and the objective lens 10. Each of the DVD light source module 21 and the CD light source module 22 is a module provided with an integrally mounted laser diode and a photo sensor.

As afore-mentioned, a light beam having a relatively long wavelength is used for the CD or CD-R, while a light beam having a relatively short wavelength is used for the DVD. According to the embodiments, the DVD light source module 21 has a laser diode which emits a laser beam having a wavelength of 654 nm, and the CD light source module 22 has a laser diode which emits a laser beam having a wavelength of 788 nm.

When the DVD is used, the DVD light source module 21 is used. In FIG. 2, a cover layer of the DVD is shown by a solid line. The laser beam emitted by the DVD light source module 21 is converged on a data recording surface, which corresponds to the right-hand side of the cover layer, of the DVD as indicated by solid lines in FIG. 2.

When the CD (or CD-R) is used, the CD light source module 22 is used. In FIG. 2, a cover layer of the CD (or CD-R) is shown by a broken line. The laser beam emitted by the CD light source module 22 is converged on a data recording surface, which corresponds to the right-hand side of the cover layer, of the CD (or CD-R) as indicated by broken lines in FIG. 2. It should be noted that, in FIG. 2, only the beams that contribute to recording/readout of the data on the disc are indicated.

The diffraction lens structure formed within the common area Rc is designed such that the diffraction efficiency of the first order diffraction light is highest for the plurality of wavelengths (in this embodiment, two wavelengths: 654 nm and 788 nm).

Further, the diffraction lens structure within the common area Rc is designed such that the variation of the spherical aberration due to the difference of the thickness of the cover layers of the DVD (thickness: 0.6 mm) and CD (or CD-R) (thickness: 1.2 mm) is compensated for by switching the wavelengths of the used beams between 654 nm and 788 nm.

It is generally known that the spherical aberration of the entire optical system, including the cover layer of the optical disc, changes in an overcorrected direction as the thickness of the cover layer becomes thicker. When the DVD, which has a thinner cover layer, is used, a beam having a shorter wavelength is used, and when the CD, which has a thicker cover layer, is used, a beam having a longer wavelength is used. In view of this fact, the diffraction lens structure is designed such that the spherical aberration has a wavelength dependency, i.e., the spherical aberration changes in an undercorrected direction when the wavelength increases. With this configuration, by appropriately designing the diffraction lens structure, the spherical aberration which changes in the overcorrected direction as the thickness of the cover layer increases can be canceled by the spherical aberration of the diffraction lens structure which changes in the undercorrected direction as the wavelength increases from 654 nm to 788 nm.

The diffraction lens structure formed within the exclusive high NA area Rh is designed to have a function of converging the beam having the wavelength of 654 nm, and diffusing the beam having the wavelength of 788 nm. A base curve and an OPD function of the exclusive high NA area Rh are determined such that the beam having the wavelength of 654 nm is sufficiently converged on the DVD. Specifically, according to the invention, the diffraction lens structure formed in the exclusive high NA area Rh has a plurality of annular zones, boundaries of which are determined independently from the boundaries obtained by the OPD function defining the diffraction lens structure while substantially keeping the base curve of the exclusive high NA area. That is, the boundaries are determined such that the light beam having the wavelength of 654 nm is converged substantially at one point, and such that it sufficiently diffuses the light beam having the wavelength of 788 nm. With this configuration, the beam having the wavelength of 788 nm incident on the exclusive high NA area Rh does not contribute to forming a beam spot. Therefore, for the beam having the wavelength of 788 nm, the exclusive high NA area Rh substantially functions to restrict a diameter of the beam to that of the common area Rc.

It should be noted that each of the light source modules for the DVD and the CD (or CD-R) can be considered as monochromatic light. Therefore, when the diffraction lens structure is formed, the diffraction order can be varied. For the disc having a higher recording density, it is preferable that light incident on all the annular zones is converged substantially on a single point. Design of such a configuration is relatively flexible since the diffraction order is not restricted. Thus, by determining boundaries of the annular zones individually with maintaining the above configuration, it becomes possible to have the function of restricting the diameter of the beam for the disc having the lower recording density.

In particular, the diffraction lens structure formed in the exclusive high NA area Rh is configured to provide no aberration for the disc having the higher data recording density, and to provide wavefront aberration for the disc having the lower data recording density. Thus, the exclusive high NA area Rh of the objective lens diffuses the light passed therethrough when the disc having the lower data recording density is used. Preferably, in this case, the phase of the light having the longer wavelength and passed through the exclusive high NA area is not polarized in a certain direction but evenly distributed (i.e., 360°). If the phase is evenly distributed, the light passed through the exclusive high NA area can be well diffused, and the diameter of the beam can be restricted substantially.

The intensity of light, which is passed through a predetermined portion of a lens, on a certain reference point is obtained by applying a diffractive integration with respect to the wavefront aberration of the light passed through the predetermined portion. If the wavefront aberration is biased in one direction (i.e., the phase is not evenly distributed), the integration provides a relatively large value. In such a case, the light is considered to converge on the reference point. In contrast, if the wavefront aberration is impartially distributed within a range of one wavelength, the integration results may be close to zero. In such a case, the light is considered not to converge on the reference point.

The wavefront aberration is determined as an optical path length difference with respect to a reference optical path length. If a width of each annular zone is relatively narrow, the change of the optical path difference across the annular zone is relatively small, and in such a case, fluctuation of the wavefront aberration is relatively small, and the light is converged. On the contrary, if the width of the annular zone is sufficiently wide and the change of the optical path difference is approximately one wavelength, the wavefront aberration fluctuates with the range of one wavelength depending on the position on the annular zone, and in such a case, the light does not converge on the reference point.

Specifically, the diffraction lens structure formed in the exclusive high NA area Rh is configured to have a plurality of annular zones, and at least one zone is designed such that, for the beam having the wavelength of 788 nm, an optical path difference (hereinafter, referred to as the OPD) between an optical path length of a ray passed through an inner end (i.e., the optical axis side end) thereof and an optical path length of a ray passed through an outer end (i.e., the peripheral side end) thereof is 0.6λ or more.

Numerical Embodiments

Hereinafter, three numerical embodiments and a comparative example will be described. Each of the embodiments and the comparative example provides an objective lens for an optical pick-up which is used both for the DVD having a cover layer of 0.6 mm thick, and the CD (or CD-R) having a cover layer of 1.2 mm thick.

The objective lenses according to the three embodiments and the comparative example include portions having the same structure, which are:

the structure of the common area Rc;

a base curve, which is an aspherical shape, of the exclusive high NA area Rh;

the OPD function defining the diffraction lens structure; and the actual shape of the diffraction lens structure formed in the common area Rc.

In other words, the three embodiments and the comparative example are different only by the concrete structure of the diffraction lens structure formed in the exclusive high NA area Rh.

COMPARATIVE EXAMPLE

The objective lens according to the comparative example is configured such that, in each annular zone formed in the exclusive high NA area Rh, a difference between an optical path length of a ray passed through the inner side of the zone and the optical path length of a ray passed through the outer side of the zone is equal to the wavelength of the beam for the DVD (i.e., 654 nm). Further, in the comparative example, a gap (i.e., a difference of profiles) between adjoining zones is designed such that a difference between optical path lengths of rays passed through the adjoining zones at the boundary thereof is equal to the wavelength of the beam for the DVD (i.e., 654 nm). For the beam of the CD (CD-R) having the wavelength of 788 nm, a difference between an optical path length of a ray passed through the inner side of the zone and the optical path length of a ray passed through the outer side of the zone is less than 0.6λ. (λ denotes the wavelength).

In contrast, the objective lens according to each of the embodiments includes at least one annular zone which is configured such that, for the beam (788 nm) for the CD (CD-R), a difference between an optical path length of a ray passed through the inner side of the zone and the optical path length of a ray passed through the outer side of the zone is 0.6λ or more.

TABLE 1 below indicates numerical data of the objective lens according to the comparative example.

The first surface (the light source side surface) of the objective lens is divided into the common area Rc, for which the height h from the optical axis is $0 \leq h < 1.538$ (mm), and the exclusive high NA area Rh, for which the height h from the optical axis is $1.538 \leq h \leq 2.023$ (mm). In the common area Rc and the exclusive high NA area Rh, diffraction lens structures expressed by different OPD functions are formed, respectively. The base curves (i.e., the shape of the lens surface excluding the diffraction lens structure) of the common area Rc and that of the exclusive high NA area Rh are also different, both of which are aspherical surfaces defined by different coefficients.

The second surface (disc side surface) of the objective lens is an aspherical surface which is not formed with a diffraction lens structure.

The additional optical path added by the diffraction lens structure is expressed by the OPD (optical path difference) function $\phi(h)$ indicated below.

$$\phi(h) = (P_2 h^2 + P_4 h^4 + P_6 h^6 + \ldots) \times m \times \lambda$$

where, Pn represents n-th order (n being even number) OPD function coefficients, m represents a diffraction order, and λ represents the wavelength.

The OPD function $\phi(h)$ represents a difference of an optical path of a beam which would not be diffracted by the diffraction lens structure and an optical path of the beam which has been diffracted by the diffraction lens structure, at a point on the objective lens whose height with respect to the optical axis is h.

The aspherical surface is expressed by a polynomial indicated below.

$$X(h) = \frac{Ch^2}{1 + \sqrt{1-(1+\kappa)C^2h^2}} + A_4h^4 + A_6h^6 + A_8h^8 + A_{10}h^{10} + A_{12}h^{12}$$

where, X(h) is a SAG amount representing a distance between a plane tangential to the aspherical surface at a point where the optical axis intersects with the aspherical surf ace and a point on the aspherical surface whose height with respect to the optical axis is h. C represents a curvature (=1/r) of the aspherical surface on the optical axis, $\kappa$ is a conical coefficient, $A_4$, $A_6$, $A_8$, $A_{10}$ and $A_{12}$ are forth, sixth, eighth, tenth, and twelfth order aspherical coefficients.

TABLE 1 shows coefficients defining the base curves, the diffraction lens structure of the common area Rc of the first surface (i.e., the light source side surface) of the objective lens, coefficients defining the diffraction lens structure in the exclusive high NA area, a distance between adjoining surface on the optical axis, refractive indexes, and coefficients defining the second surface, which is an aspherical surface.

TABLE 1

FIRST SURFACE

| Base Curve | | Diffraction Lens structure | |
|---|---|---|---|
| Common Area Rc ($0 \leq h < 1.538$) | | | |
| paraxial radius of curvature 2.131 mm | | blaze wavelength 720 nm | |
| Aspherical surface coefficients | | OPD function coefficients | |
| $\kappa$ | $-0.500$ | $P_2$ | $-1.50000$ |
| $A_4$ | $-2.07000 \times 10^{-3}$ | $P_4$ | $-1.63000$ |
| $A_6$ | $-1.05600 \times 10^{-4}$ | $P_6$ | $-0.16000$ |
| $A_8$ | $-1.32300 \times 10^{-4}$ | $P_8$ | $0.00000$ |
| $A_{10}$ | $4.63600 \times 10^{-5}$ | $P_{10}$ | $0.00000$ |
| $A_{12}$ | $-1.00000 \times 10^{-5}$ | $P_{12}$ | $0.00000$ |
| Exclusive high NA Area Rh ($1.538 \leq h \leq 2.023$) | | | |
| paraxial radius of curvature 2.148 mm | | blaze wavelength 654 nm | |
| Aspherical surface coefficients | | OPD function coefficients | |
| $\kappa$ | $-0.500$ | $P_2$ | $-3.03517$ |
| $A_4$ | $-9.83900 \times 10^{31\ 4}$ | $P_4$ | $-0.74300$ |
| $A_6$ | $8.70200 \times 10^{-5}$ | $P_6$ | $-0.14100$ |
| $A_8$ | $-2.02200 \times 10^{-5}$ | $P_8$ | $0.00000$ |
| $A_{10}$ | $6.60440 \times 10^{-5}$ | $P_{10}$ | $0.00000$ |
| $A_{12}$ | $-1.16640 \times 10^{-5}$ | $P_{12}$ | $0.00000$ |

SECOND SURFACE

| | | | |
|---|---|---|---|
| paraxial radius of curvature $-8.185$ mm | | | |
| Aspherical surface coefficients | | | |
| $\kappa$ | 0.000 | | |
| $A_4$ | $1.42800 \times 10^{-2}$ | | |
| $A_6$ | $-2.04300 \times 10^{-3}$ | | |
| $A_8$ | $-9.30800 \times 10^{-5}$ | | |
| $A_{10}$ | $-1.64700 \times 10^{-5}$ | | |
| $A_{12}$ | $6.74500 \times 10^{-6}$ | | |
| a distance between First and Second surfaces | | 2.200 mm | |
| refractive index | at 645 nm | 1.54067 | |
| | at 788 nm | 1.53657 | |
| working distance (i.e., a distance from the second surface to the disc surface) | | DVD is used 1.754 mm CD is used 1.387 mm | |

TABLE 2 shows the height hin, from the optical axis, of the inner side end, and the height hout, from the optical axis, of the outer side end of each annular zone, to which a zone number N is assigned from the optical axis side, a circular zone including the optical axis being indicated as zone #1. Further, TABLE 2 shows the value of the OPD function $\phi$(hout) at the outer side end of each annular zone is shown. In TABLE 2, unit of the values are mm for hin and hout, and the value of the OPD function $\phi$(hout) is represented by a unit of wavelength. Zones 1–15 are formed in the common area Rc, and zones 16–35 (see TABLE 3) are formed in the exclusive high NA area Rh.

TABLE 2

| N | hin | hout | $\phi$(hout) |
|---|---|---|---|
| #1 | 0.000 | 0.509 | −0.500 |
| #2 | 0.509 | 0.771 | −1.500 |
| #3 | 0.771 | 0.916 | −2.500 |
| #4 | 0.916 | 1.020 | −3.500 |
| #5 | 1.020 | 1.101 | −4.500 |
| #6 | 1.101 | 1.169 | −5.500 |
| #7 | 1.169 | 1.227 | −6.500 |
| #8 | 1.227 | 1.278 | −7.500 |
| #9 | 1.278 | 1.324 | −8.500 |
| #10 | 1.324 | 1.365 | −9.500 |
| #11 | 1.365 | 1.403 | 10.500 |
| #12 | 1.403 | 1.438 | −11.500 |
| #13 | 1.438 | 1.471 | −12.500 |
| #14 | 1.471 | 1.501 | −13.500 |
| #15 | 1.501 | 1.538 | −14.786 |

TABLE 3 shows the height hin, from the optical axis, of the inner side end, and the height hout, from the optical axis, of the outer side end of each annular zone. Further, in TABLE 3, the value of the OPD function $\phi$(hout) with respect to the ray passed through the outer side end of each annular zone, the width W of each zone, wavefront aberration at the inner side end of the zone WFin with respect to the converging point of the beam for CD as a center of a reference sphere, wavefront aberration at the outer side end of the zone WFout, and a difference $\Delta$WF between the wavefront aberration at the inner side end and outer side end of the zone are shown.

TABLE 3

| N | hin | hout | $\phi$(hout) | W | WFin | WFout | $\Delta$WF |
|---|---|---|---|---|---|---|---|
| #16 | 1.538 | 1.616 | −15.500 | 0.078 | 0.094 | −0.442 | 0.54 |
| #17 | 1.616 | 1.647 | −16.500 | 0.031 | −0.264 | −0.501 | 0.24 |
| #18 | 1.647 | 1.676 | −17.500 | 0.029 | −0.322 | −0.561 | 0.24 |
| #19 | 1.676 | 1.703 | −18.500 | 0.028 | −0.382 | −0.623 | 0.24 |
| #20 | 1.703 | 1.730 | −19.500 | 0.026 | −0.444 | −0.686 | 0.24 |
| #21 | 1.730 | 1.775 | −20.500 | 0.025 | −0.507 | −0.750 | 0.24 |
| #22 | 1.775 | 1.779 | −21.500 | 0.024 | −0.570 | −0.815 | 0.24 |
| #23 | 1.779 | 1.802 | −22.500 | 0.023 | −0.635 | −0.880 | 0.25 |
| #24 | 1.802 | 1.824 | −23.500 | 0.022 | −0.700 | −0.947 | 0.25 |
| #25 | 1.824 | 1.845 | −24.500 | 0.021 | −0.767 | −1.014 | 0.25 |
| #26 | 1.845 | 1.865 | −25.500 | 0.020 | −0.833 | −1.081 | 0.25 |
| #27 | 1.865 | 1.885 | −26.500 | 0.020 | −0.901 | −1.149 | 0.25 |
| #28 | 1.885 | 1.904 | −27.500 | 0.019 | −0.969 | −1.218 | 0.25 |
| #29 | 1.904 | 1.923 | −28.500 | 0.018 | −1.037 | −1.287 | 0.25 |
| #30 | 1.923 | 1.941 | −29.500 | 0.018 | −1.105 | −1.356 | 0.25 |
| #31 | 1.941 | 1.958 | −30.500 | 0.017 | −1.174 | −1.425 | 0.25 |
| #32 | 1.958 | 1.975 | −31.500 | 0.017 | −1.243 | −1.494 | 0.25 |
| #33 | 1.975 | 1.991 | −32.500 | 0.016 | −1.312 | −1.563 | 0.25 |
| #34 | 1.991 | 2.007 | −33.500 | 0.016 | −1.381 | −1.633 | 0.25 |
| #35 | 2.007 | 2.023 | −34.500 | 0.015 | −1.450 | −1.702 | 0.25 |

Figure 3:
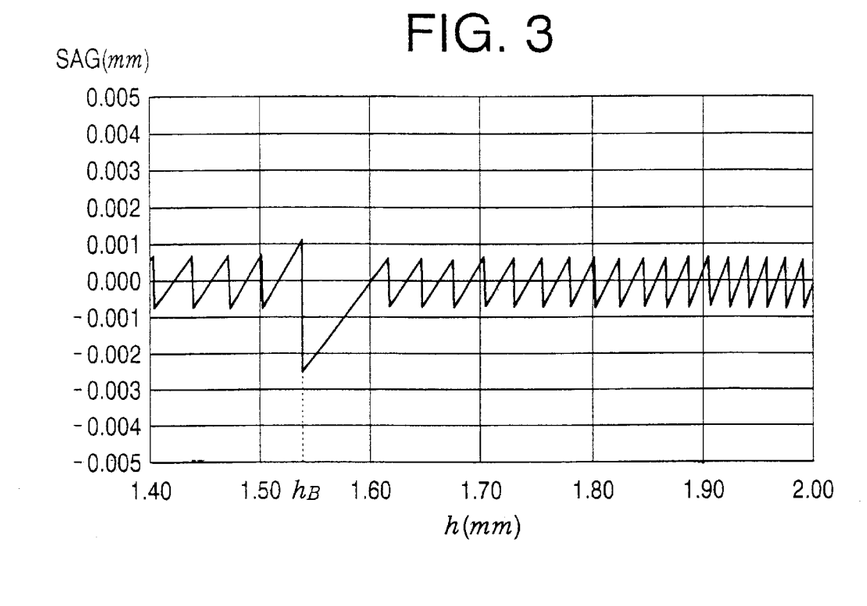
FIG. 3 is a graph showing a sag amount of a diffractive lens structure formed on a comparative objective lens.

FIG. 3 is a graph showing a SAG amount of the diffraction lens structure with respect to the base curve of the comparative example within a range of h=1.40 mm to h=2.00 mm, i.e., at a peripheral portion of the common area Rc to substantially the outer end of the exclusive high NA area Rh. A large step at h=$h_B$=1.538 represents a boundary between the common area Rc and the exclusive high NA area Rh.

As shown in FIG. 3 and derived from TABLE 3, the innermost zone of the exclusive high NA area Rh is configured such that the difference ΔWF is 0.54λ, and the outer zones are configured such that the difference ΔWF is 0.24λ or 0.25λ. Thus, the diffraction lens structure of the comparative example does not include a zone of which the difference ΔWF is 0.6λ or greater.

It should be noted that the diffraction lens structure formed in the exclusive high NA area is configured to compensate for chromatic aberration due to variation of the wavelength of the laser beam, and to compensate for aberration due to variation of refractive index and deformation of the lens due to variation of the temperature so that sufficient optical characteristics can be achieved when the DVD is used.

Figure 4:
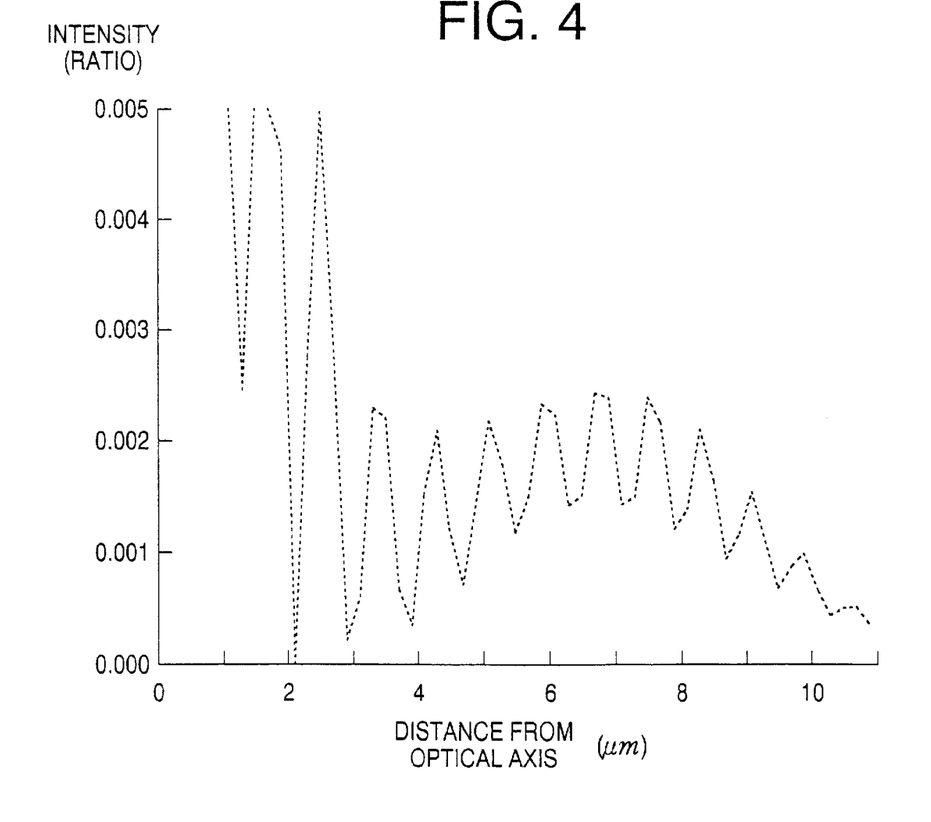
FIG. 4 is a graph showing an intensity distribution of light converged by the comparative objective lens.

FIG. 4 is a graph showing light intensity distribution on a CD when light having the wavelength of 788 nm is converged using the objective lens according to the comparative example. In the vertical axis, the intensity is normalized such that the intensity of light on the optical axis is indicated as 1 (one). The horizontal axis indicates a distance with respect to the optical axis. In order to show the intensity in the vicinity of the boundary of the beam spot for CD, the vertical axis only indicates the upper limit of 0.005, and therefore, the intensity of light at portions closer to the optical axis is not shown in the graph since it is much greater than the upper limit.

According to the structure of the comparative example, each of the zones is configured such that the difference ΔWF is less than 0.6λ, and therefore, the deviation of the optical path length within a zone is relatively small. Accordingly, when the CD is used, the wavefront aberration does not deviate sufficiently widely. Therefore, when the CD is used, the portion of the beam passed through the exclusive high NA area Rh cannot be diffused sufficiently. Therefore, according to the comparative example, as shown in FIG. 4, the light intensity in the vicinity of the boundary of the beam spot for the CD (i.e., h=5 μm to h=10 μm) is relatively large. That is, the diffraction lens structure formed in the exclusive high NA area Rh functions well in terms of compensation for aberration when the DVD is used (i.e., wavelength is 654 nm), but cannot restrict the beam size sufficiently when the CD (or CD-R) is used (i.e., wavelength is 788 nm).

Accordingly, if the comparative example is used in an optical pick-up, in which a tracking sensor for receiving sub beams is arranged at a position closely adjacent to the main sensor for receiving the main beam reflected by the CD, as in a case where a three-beam method is used for tracking operation, a flare of the main beam, which corresponds to the component passed through the exclusive high NA area, having relatively strong intensity is incident on the tracking sensors, and noises may be generated in the tracking error signal.

First Embodiment

TABLE 4 indicates the data of the diffraction lens structure formed on the exclusive high NA area of the objective lens 10 according to the first embodiment.

According to the first embodiment, five zones (i.e., zones #16 through #20), excluding the outermost zone #21, formed in the exclusive high NA area Rh is configured such that the difference of optical path lengths at the inner side end and outer side end of each zone is substantially equal to one wavelength, which is the wavelength for the CD (or CD-R). In the first embodiment, a step between the zones is designed to provide an optical path length difference of one wavelength for the DVD, as in the comparative example.

TABLE 4

| N | hin | hout | φ(hout) | W | WFin | WFout | ΔWF |
|---|---|---|---|---|---|---|---|
| #16 | 1.538 | 1.674 | −17.443 | 0.136 | 0.094 | −0.905 | 1.00 |
| #17 | 1.674 | 1.780 | −21.560 | 0.106 | −0.726 | −1.725 | 1.00 |
| #18 | 1.780 | 1.876 | −25.579 | 0.087 | −1.546 | −2.546 | 1.00 |
| #19 | 1.876 | 1.942 | −29.578 | 0.075 | −2.366 | −3.368 | 1.00 |
| #20 | 1.942 | 2.007 | −33.496 | 0.065 | −3.186 | −4.185 | 1.00 |
| #21 | 2.007 | 2.023 | −34.500 | 0.016 | −4.002 | −4.276 | 0.27 |

Figure 5:
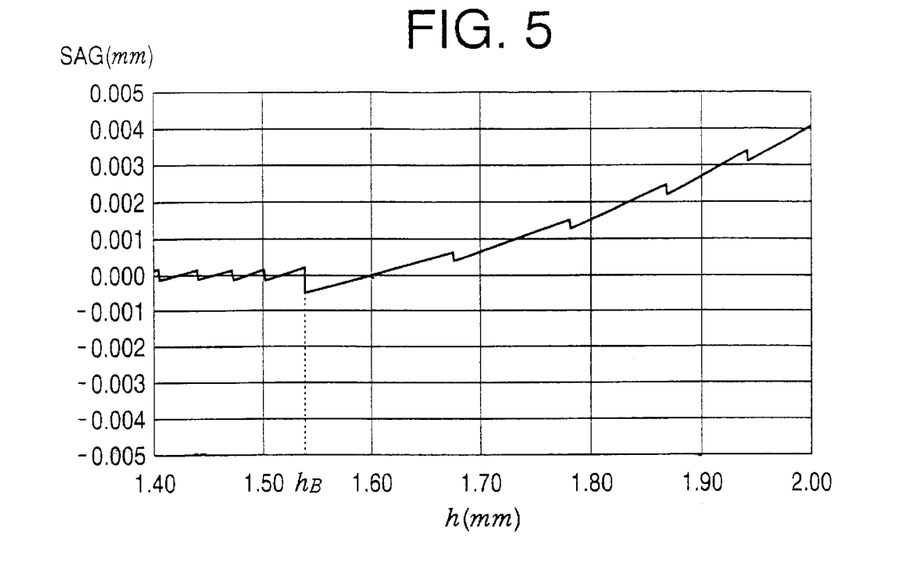
FIG. 5 is a graph showing a sag amount of a diffractive lens structure formed on an objective lens according to a first embodiment of the invention.

FIG. 5 is a graph showing a SAG amount of the diffraction lens structure formed on the objective lens in relation to the height from the optical axis according to the first embodiment. A large step at h=$h_B$=1.538 represents a boundary between the common area Rc and the exclusive high NA area Rh.

As shown in FIG. 5 and derived from TABLE 4, each of the five zones #16–#20 located on the inner side within the exclusive high NA area Rh is configured such that the difference ΔWF of the wavefront aberration between the inner side end thereof and the outer side end thereof is approximately 1.00λ, and the difference ΔWF of the outermost zone #21 is 0.27λ. Thus, the diffraction lens structure of the first embodiment includes five zones of which the difference ΔWF is 0.6λ or greater. Since the width of a zone which provides the difference ΔWF greater than 0.6λ is relatively wide with respect to the zones which provides the difference ΔWF less than 0.6λ, the former will be referred to as a wide-width zone, and the latter will be referred to as a narrow-width zone in this specification.

Figure 6:
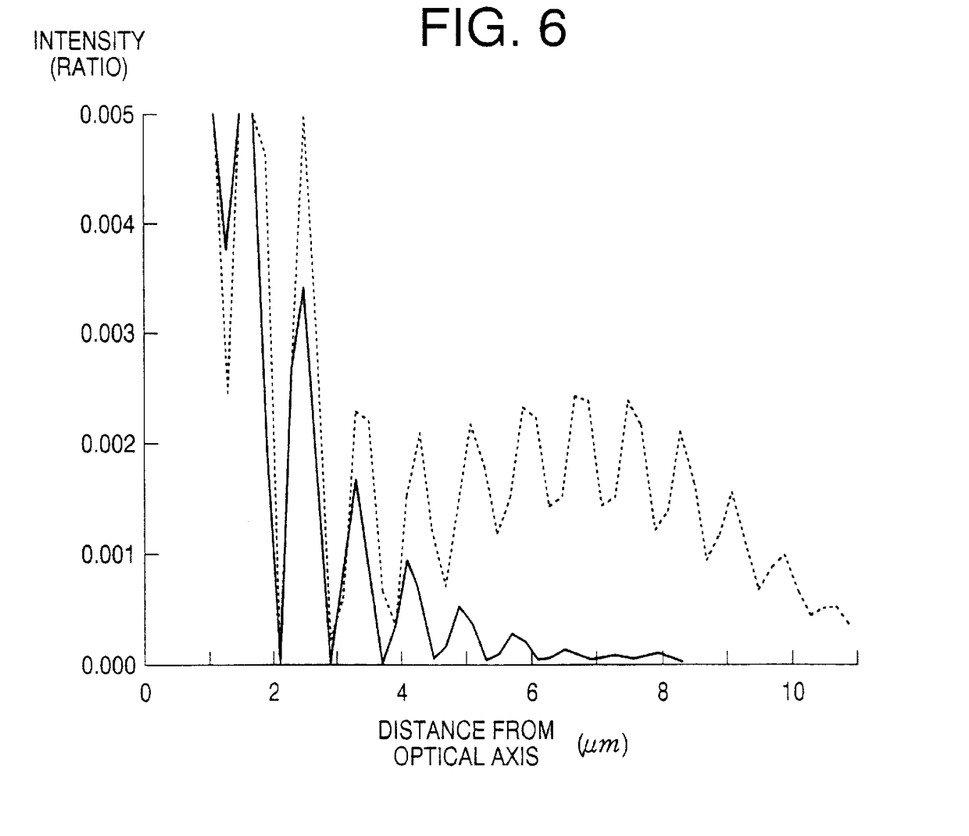
FIG. 6 is a graph showing an intensity distribution of light converged by the objective lens according to the first embodiment of the invention.

FIG. 6 is a graph showing light intensity distribution on the CD (i.e., using the beam having the wavelength of 788 nm) when the objective lens according to the first embodiment is used. In the vertical axis, the intensity is normalized such that the intensity of light on the optical axis is indicated as 1 (one). The horizontal axis indicates a distance with respect to the optical axis. The distribution according to the comparative example is shown by the broken line, and the distribution according to the first embodiment is indicated by a solid line.

According to the structure of the first embodiment, the difference ΔWF of the wavefront aberrations at the inner side end and the outer side end of a zone is 1λ for the wavelength of the CD (i.e., 788 nm), and therefore, the wavefront aberration varies in this range. As a result, as shown in FIG. 6, the intensity distribution of light incident on a portion in the vicinity of the boundary of the beam spot for the CD (i.e. at a portion where the height h ranges from 5 through 10 μm) can be suppressed to a level weaker than that of the comparative example.

In the first embodiment, however, since the steps between the zones are equal to one wavelength long so that the diffraction lens structure has the diameter size limiting function, aberrations when the DVD is used (i.e., when the beam having the wavelength of 654 nm is used) cannot be sufficiently compensated for.

As described above, the diffraction lens structure formed on the exclusive high NA area Rh functions well to limit the size of the incident beam, but does not sufficiently function to compensate for aberrations when the beam having the wavelength of 654 nm is used. Therefore, allowable ranges for variation of temperature and wavelength of the beam are relatively narrow when DVD is used.

Second Embodiment

TABLE 5 indicates the data of the diffraction lens structure formed on the exclusive high NA area of the objective lens 10 according to the second embodiment.

According to the second embodiment, the innermost annular zone #16 formed in the exclusive high NA area Rh is configured such that the optical path lengths added by the inner side end and by the outer side end thereof are different by an amount greater than 0.6λ, where λ is the wavelength for the CD (or CD-R), which is 788 nm. The other zones #17–#31 outside the innermost zone #16 are configured to be similar to those of the comparative example. Thus, the zone #16 is a wide-width zone, while the other zones #17–#31 are narrow-width zones. Further, a step between the innermost zone #16 and a zone #17 on the outer side on and next to the innermost zone #16 is designed such that the length of the step is equal to an integer multiple m of the wavelength for the DVD (i.e., 654 nm). Specifically, according to the second embodiment, m is five.

TABLE 5

| N | hin | hout | φ(hout) | W | WFin | WFout | ΔWF |
|---|---|---|---|---|---|---|---|
| #16 | 1.538 | 1.730 | −19.500 | 0.192 | 0.450 | −1.044 | 1.49 |
| #17 | 1.730 | 1.755 | −20.500 | 0.025 | −0.507 | −0.750 | 0.24 |
| #18 | 1.755 | 1.779 | −21.500 | 0.024 | −0.570 | −0.851 | 0.24 |
| #19 | 1.779 | 1.802 | −22.500 | 0.023 | −0.635 | −0.880 | 0.25 |
| #20 | 1.802 | 1.824 | −23.500 | 0.022 | −0.700 | −0.947 | 0.25 |
| #21 | 1.824 | 1.845 | −24.500 | 0.021 | −0.767 | −1.014 | 0.25 |
| #22 | 1.845 | 1.865 | −25.500 | 0.020 | −0.833 | −1.081 | 0.25 |
| #23 | 1.865 | 1.885 | −26.500 | 0.020 | −0.901 | −1.149 | 0.25 |
| #24 | 1.885 | 1.904 | −27.500 | 0.019 | −0.969 | −1.218 | 0.25 |
| #25 | 1.904 | 1.923 | −28.500 | 0.018 | −1.037 | −1.287 | 0.25 |
| #26 | 1.923 | 1.941 | −29.500 | 0.018 | −1.105 | −1.356 | 0.25 |
| #27 | 1.941 | 1.958 | −30.500 | 0.017 | −1.174 | −1.425 | 0.25 |
| #28 | 1.958 | 1.975 | −31.500 | 0.017 | −1.243 | −1.494 | 0.25 |
| #29 | 1.975 | 1.991 | −32.500 | 0.016 | −1.312 | −1.563 | 0.25 |
| #30 | 1.991 | 2.007 | −33.500 | 0.016 | −1.381 | −1.633 | 0.25 |
| #31 | 2.007 | 2.023 | −34.500 | 0.015 | −1.450 | −1.702 | 0.25 |

Figure 7:
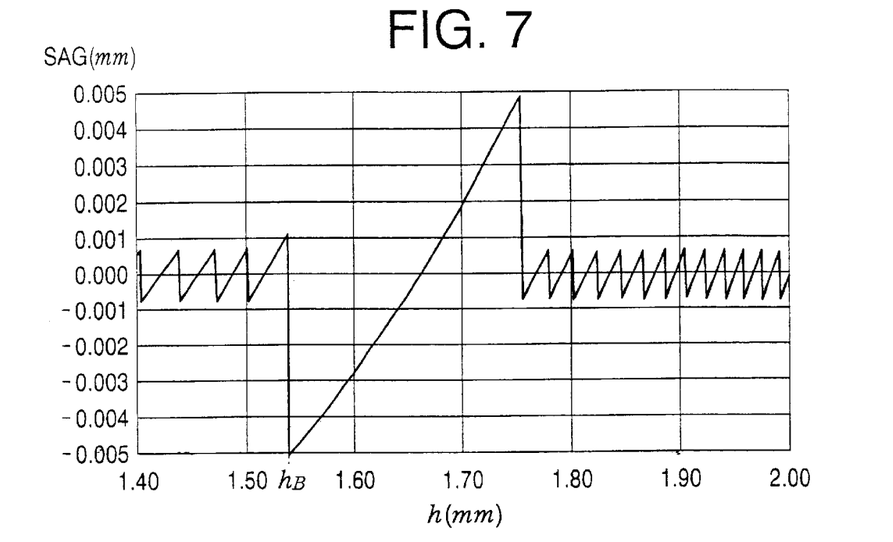
FIG. 7 is a graph showing a sag amount of a diffractive lens structure formed on an objective lens according to a second embodiment of the invention.

FIG. 7 is a graph showing a SAG amount of the diffraction lens structure formed on the objective lens in relation to the height h from the optical axis according to the second embodiment. A large step at h=$h_B$=1.538 represents a boundary between the common area Rc and the exclusive high NA area Rh.

As shown in FIG. 7 and derived from TABLE 5, the innermost zone #16 within the exclusive high NA area Rh is configured such that the difference ΔWF of the wavefront aberration between the inner side end thereof and the outer side end thereof is 1.49λ, and the difference ΔWF of the other zones #17-#31 outside the innermost zone #16 are 0.24λ or 0.25λ. Thus, the diffraction lens structure of the second embodiment includes one zone of which the difference ΔWF is 0.6λ or greater.

Figure 8:
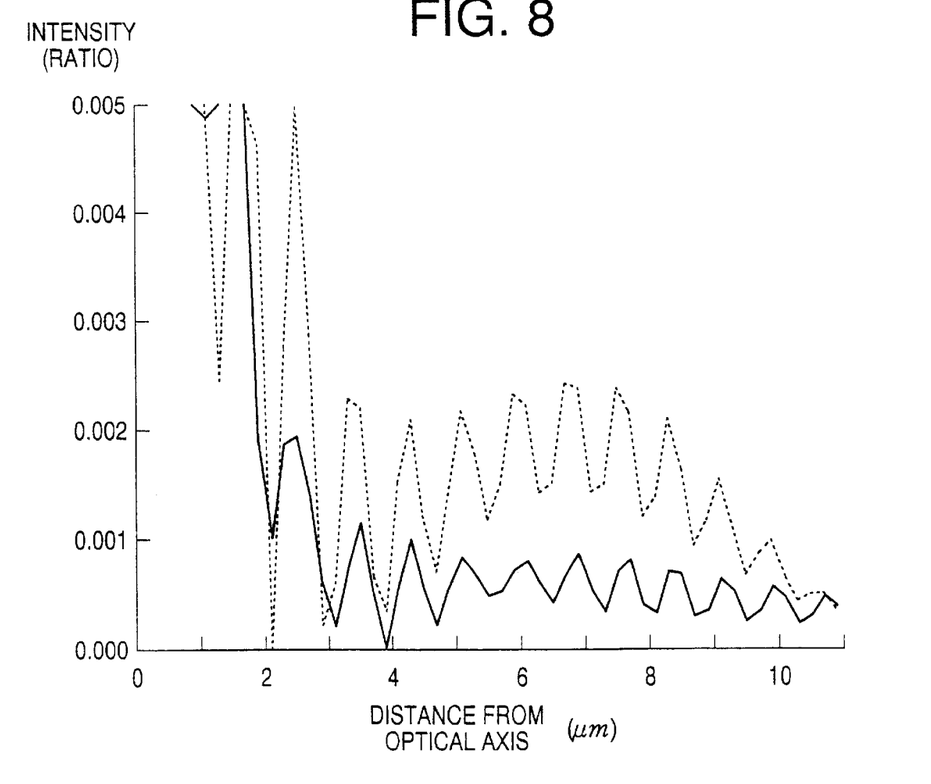
FIG. 8 is a graph showing an intensity distribution of light converged by the objective lens according to the second embodiment of the invention.

FIG. 8 is a graph showing light intensity distribution of the CD (i.e., when the beam having the wavelength of 788 nm is used) when the objective lens according to the second embodiment is used. In the vertical axis, the intensity is normalized such that the intensity of light on the optical axis is indicated as 1 (one). The horizontal axis indicates a distance with respect to the optical axis. The distribution according to the comparative example is shown by the broken line, and the distribution according to the second embodiment is indicated by a solid line.

According to the structure of the second embodiment, as shown in FIG. 8, the intensity of light at a portion outside a beam spot for the CD and in the vicinity thereof (i.e., 5–10 μm) can be suppressed to be lower than that of the comparative example. Further, the height of the step provided by the zone #16 is five times the wavelength of the DVD, variation of the wavefront aberrations due to change of temperature and/or wavelength when the DVD is used can be well suppressed as in the comparative example.

Accordingly, the diffraction lens structure formed in the exclusive high NA area functions to restrict the size of the diameter of the beam having the wavelength of 788 nm, and to compensate for aberrations when the beam for the DVD (i.e., the beam having the wavelength of 654 nm) is used.

Third Embodiment

TABLE 6 indicates the data of the diffraction lens structure formed on the exclusive high NA area of the objective lens 10 according to the third embodiment.

According to the third embodiment, four wide-width zones #16, #21, #26 and #31 are formed in the exclusive high NA area Rh, and between the adjoining ones of the wide-width zones, four narrow-width annular zones are arranged. Specifically, between each annular zone, there is a step having a height of one wavelength of the DVD (i.e., 654 nm), and thus, the wide-width zones #16, #21, #26 and #31 provide the wavelength difference of five times the wavelength of the DVD as a whole. It should be noted that each of the narrow-width annular zone only provide a relatively small difference ΔWF.

TABLE 6

| N | hin | hout | φ(hout) | W | WFin | WFout | ΔWF |
|---|---|---|---|---|---|---|---|
| #16 | 1.538 | 1.668 | −17.219 | 0.130 | 0.094 | −0.851 | 0.95 |
| #17 | 1.668 | 1.672 | −17.359 | 0.004 | −0.673 | −0.706 | 0.03 |
| #18 | 1.672 | 1.676 | −17.500 | 0.004 | −0.527 | −0.561 | 0.03 |
| #19 | 1.676 | 1.680 | −17.642 | 0.004 | −0.382 | −0.416 | 0.03 |
| #20 | 1.680 | 1.684 | −17.785 | 0.004 | −0.238 | −0.272 | 0.03 |
| #21 | 1.684 | 1.794 | −22.148 | 0.110 | −0.093 | −1.153 | 1.06 |
| #22 | 1.794 | 1.798 | −22.323 | 0.004 | −0.973 | −1.017 | 0.04 |
| #23 | 1.798 | 1.802 | −22.500 | 0.004 | −0.837 | −0.880 | 0.04 |
| #24 | 1.802 | 1.806 | −22.678 | 0.004 | −0.700 | −0.744 | 0.04 |
| #25 | 1.806 | 1.810 | −22.858 | 0.004 | −0.564 | −0.608 | 0.04 |
| #26 | 1.810 | 1.896 | −27.077 | 0.087 | −0.428 | −1.474 | 1.05 |
| #27 | 1.896 | 1.900 | −27.288 | 0.004 | −1.293 | −1.346 | 0.05 |
| #28 | 1.900 | 1.904 | −27.500 | 0.004 | −1.165 | −1.218 | 0.05 |
| #29 | 1.904 | 1.908 | −27.714 | 0.004 | −1.037 | −1.090 | 0.05 |
| #30 | 1.908 | 1.912 | −27.929 | 0.004 | −0.909 | −0.963 | 0.05 |
| #31 | 1.912 | 1.983 | −32.007 | 0.071 | −0.781 | −1.804 | 1.02 |
| #32 | 1.983 | 1.987 | −32.253 | 0.004 | −1.622 | −1.684 | 0.06 |
| #33 | 1.987 | 1.991 | −32.500 | 0.004 | −1.501 | −1.563 | 0.06 |
| #34 | 1.991 | 1.995 | −32.749 | 0.004 | −1.381 | −1.443 | 0.06 |
| #35 | 1.995 | 2.023 | −34.500 | 0.027 | −1.261 | −1.702 | 0.44 |

Figure 9:
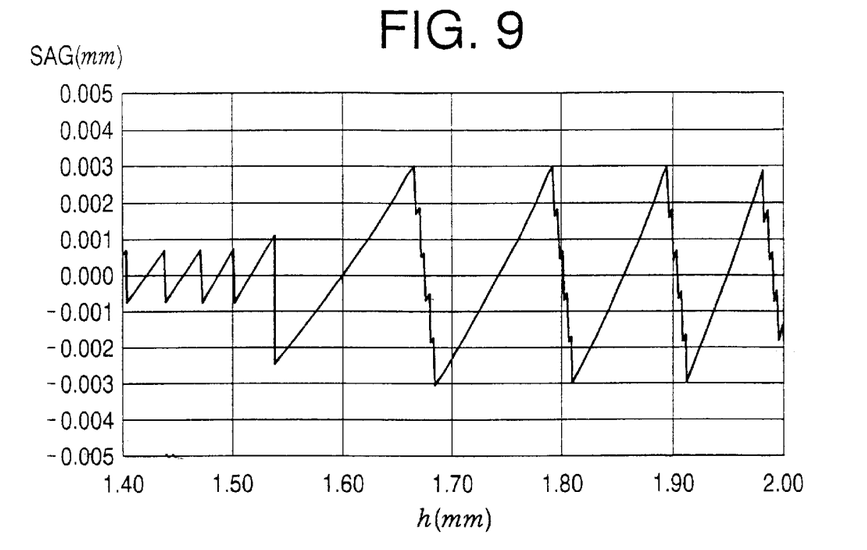
FIG. 9 is a graph showing a sag amount of a diffractive lens structure formed on an objective lens according to a third embodiment of the invention.

FIG. 9 is a graph showing a SAG amount of the diffraction lens structure formed on the objective lens in relation to the height h from the optical axis according to the third embodiment with respect to the base curve thereof. A large step at h=$h_B$=1.538 represents a boundary between the common area Rc and the exclusive high NA area Rh.

As shown in FIG. 9 and derived from TABLE 6, the annular zones #16, #21, #26 and #31 are wide-width zones, each of which is configured such that the difference ΔWF of the wavefront aberration between the inner side end thereof and the outer side end thereof is approximately equal to λ, and the narrow-width annular zones arranged between the wide-width annular zones are designed such that the differences ΔWF thereof fall within a range from 0.03λ to 0.06λ.

If the step between the zones are relatively large, a mold may be formed to have a deep concave portion. In such a case, depending on a molding condition, lens material (i.e., resin) may not be filled in the deep end of the concave portion of the mold. Then, thus formed diffraction lens may have dully formed convex portion, and a desired diffraction effect may not be achieved.

If a relatively high step (e.g., 5λ long) is divided into a small height and the desired step is achieved by the entire lens structure as in the third embodiment, the above-described problem can be avoided, and still obtain the desired effect, and loss of light can be suppressed.

When the narrow-width annular zones are formed at a stepped portion having an optical path length difference of an integer multiple of a predetermined wavelength, the narrow-width annular zone is designed to satisfy the following conditions.

$$10\lambda h/(n0-n1) < Ww \quad (1)$$

$$\lambda h/(n0-n1) < Wn < 10\lambda h/(n0-n1) \quad (2)$$

where, $\lambda h$ represents the wavelength for the CD, n0 and n1 represent refractive indexes of air and the objective lens, respectively, and Ww and Wn represent the widths of the wide-width annular zone and narrow-width annular zone, respectively.

Specifically, the width Wn defined by condition (2) falls within a range of approximately 0.0016 through 0.0158 mm. All the narrow-width annular zones according to the third embodiment satisfy this condition. In the narrow-width annular zone, because of its narrow width, variation of the wavefront aberration is relatively small, and therefore, the light passed through the narrow-width annular zones converges on a portion outside and in the vicinity of the beam spot for the CD. However, the width Wn is restricted by the upper limit of condition (2), and thus, so is the intensity of light passed through the narrow-width annular zones. Accordingly, the effect of the light having the wavelength for the CD and converged on a portion outside and in the vicinity of the beam spot for the CD is well suppressed.

Figure 10:
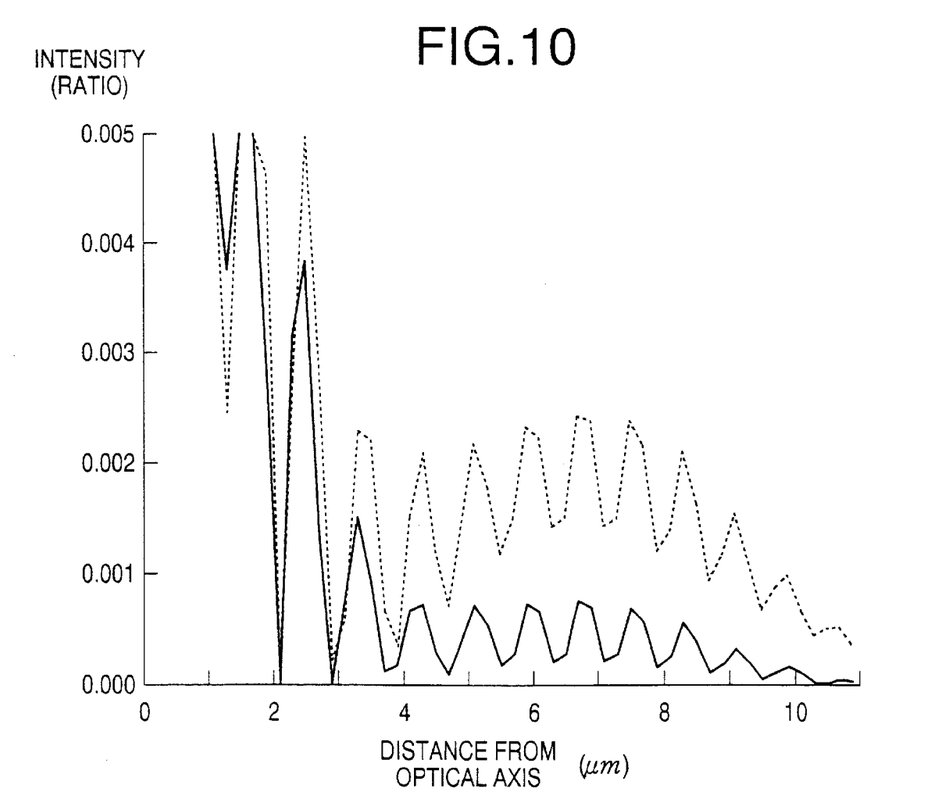
FIG. 10 is a graph showing an intensity distribution of light converged by the objective lens according to the third embodiment of the invention.

FIG. 10 is a graph showing light intensity distribution of the CD when the objective lens according to the third embodiment is used. In the vertical axis, the intensity is normalized such that the intensity of light on the optical axis is indicated as 1 (one). The horizontal axis indicates a distance with respect to the optical axis. The distribution according to the comparative example is shown by the broken line, and the distribution according to the third embodiment is indicated by a solid line.

According to the structure of the third embodiment, as shown in FIG. 10, the intensity of light at a portion outside a beam spot for the CD and in the vicinity thereof (i.e., 5–10 μm) can be suppressed to be lower than that of the comparative example. Further, the step provided by the wide-width annular zones is five times the wavelength of the DVD (i.e., 654 nm), and therefore, variation of the wavefront aberrations due to change of temperature and/or wavelength when the DVD is used can be well suppressed as in the comparative example. Accordingly, the diffraction lens structure formed in the exclusive high NA area functions to restrict the size of the diameter of the beam when the beam for the CD (i.e., when the wavelength is 788 nm) is used, and to compensate for aberrations when the beam for the DVD is used (i.e., when the wavelength is 654 nm).

The present disclosure relates to the subject matter contained in Japanese Patent Application No. 2001-179127, filed on Jun. 13, 2001, which is expressly incorporated herein by reference in its entirety.

What is claimed is:

1. An objective lens for an optical pick-up, said objective lens consisting of a refractive lens element provided with a diffraction lens structure on at least one surface of said refractive lens element, said diffraction lens structure having a plurality of annular zones having steps therebetween, said objective lens being capable of converging at least two beams having different wavelengths on at least two types of optical discs having different data recording densities, respectively, said objective lens being partitioned into a common area through which a beam with a low NA corresponding to a low data density optical disc passes and an exclusive high NA area which is designed to converge a beam with a high NA corresponding to a high data density optical disc, a base curve and an optical path difference function for said exclusive high NA area being determined such that a beam having a wavelength for the high data density optical disc is sufficiently converged thereon, boundaries of at least part of said annular zones formed on said exclusive high NA area being designed independently from boundaries obtained from the optical path difference function so that the beam with the high NA is converged substantially at a point and the beam with the low NA is diffused.

2. The objective lens according to claim 1, the beam with the low NA having a first wavelength, the beam with the high NA having a second wavelength, the first wavelength being greater than the second wavelength.

3. The objective lens according to claim 2, wherein the second wavelength is less than 90% of the first wavelength.

4. An objective lens for an optical pick-up, said objective lens converging at least two beams having different wavelengths to form beam spots having different sizes on optical discs having different data recording densities, respectively, said objective lens comprising:

a refraction lens having a positive power; and a diffraction lens structure having a plurality of annular zones formed on at least one surface of said refraction lens, the objective lens being partitioned into a common area through which a beam with a low NA corresponding to a low data density optical disc passes and an exclusive high NA area through which only a beam with a high NA corresponding to a high data density optical disc passes, said diffraction lens structure formed in said common area exhibiting spherical aberration which has a wavelength dependency such that variation of aberration due to difference of cover layers of the two types of optical discs is canceled by difference of wavelengths of the beams;

said diffraction lens structure formed in said exclusive high NA area having a plurality of annular zones, said diffraction lens structure formed in said exclusive high NA area exhibiting no aberrations with respect to a beam converging point for the optical disc having the high data recording density for the beam used for the optical disc having the high data recording density, said plurality of annular zones including at least one wide-width zone which is configured such that, with respect to a beam converging point for the disc having the low recording density, a difference of optical path lengths at inner side end and outer side end of said at least one wide-width zone is equal to or more than 0.6 times the wavelength of the beam used for the optical disc having the low data recording density.

5. The objective lens according to claim 4, wherein said diffraction lens structure formed in said exclusive high NA area is configured such that a step is formed at each boundary of said at least one of said wide-width zones and an other portion, said step providing an optical difference of m times the wavelength of the beam for the disc having the high data recording density, m being an integer not less than two.

6. The objective lens according to claim 4, wherein said at least one wide-width zone consists of m of said plurality of wide-width annular zones, said m of said plurality of wide-width annular zones being arranged stepwise such that each of said m of said plurality of wide-width annular zones provides an optical path length difference of one wavelength of the beam for the disc having the high data recording density.

7. The objective lens according to claim 6, wherein at least one narrow-width annular zone which provides an optical path difference of less than 0.6 times the wavelength of the beam for the disc having the high data recording density is arranged between said m of said plurality of wide-width annular zones.

8. The objective lens according to claim 7, configured to satisfy conditions:

$10\lambda h/(n0-n1) < Ww$; and $\lambda h/(n0-n1) < Wn < 10\lambda h/(n0-n1)$, wherein $\lambda h$ represents a wavelength of the beam for the disc having the low data recording density, n0 represents a refractive index of the air, n1 represents a refractive index of said refraction lens element, Ww represents a width of each of said m of said plurality of wide-width annular zones, and Wn represents a width of each of said at least one narrow-width annular zone providing an optical path difference of less than 0.6 times the wavelength of the beam for the disc having the high data recording density.

9. The objective lens according to claim 4, wherein said at least one of said plurality of annular zones includes a plurality of wide-width annular zones, each of said plurality of wide-width annular zones being configured such that, with respect to a beam converging point for the disc having the low recording density, a difference of optical path lengths at inner side end and outer side end of said at least one of said plurality of wide-width annular zones being equal to or more than 0.75 times the wavelength of the beam used for the optical disc having the low data recording density.

10. The objective lens according to claim 4, wherein a difference of optical path difference $\Delta OPD$ at inner side end and outer side end of each of said at least one of said plurality of wide-width annular zones satisfies a condition:

$75\lambda < \Delta OPD < 1.25\lambda$, wherein, $\lambda$ represents a wavelength of the beam for the disc having the low data recording density.

* * * * *